US009896361B2

(12) United States Patent
Leland et al.

(10) Patent No.: US 9,896,361 B2
(45) Date of Patent: Feb. 20, 2018

(54) ORBITAL WASTEWATER TREATMENT SYSTEM AND METHOD OF OPERATING SAME

(71) Applicant: Ovivo Inc., Montreal (CA)

(72) Inventors: Thomas Leland, Salt Lake City, UT (US); Joy Emory, Salt Lake City, UT (US); Steve Myers, Farmington, UT (US)

(73) Assignee: OVIVO INC, Montreal (CA)

( * ) Notice: Subject to any disclaimer, the term of this patent is extended or adjusted under 35 U.S.C. 154(b) by 29 days.

(21) Appl. No.: 14/863,678

(22) Filed: Sep. 24, 2015

(65) Prior Publication Data

US 2016/0107909 A1 Apr. 21, 2016

Related U.S. Application Data

(60) Provisional application No. 62/055,278, filed on Sep. 25, 2014.

(51) Int. Cl.
| | |
|---|---|
| C02F 3/00 | (2006.01) |
| C02F 3/12 | (2006.01) |
| C02F 3/20 | (2006.01) |
| C02F 3/30 | (2006.01) |

(52) U.S. Cl.
CPC ............ *C02F 3/006* (2013.01); *C02F 3/1257* (2013.01); *C02F 3/20* (2013.01); *C02F 3/301* (2013.01); *C02F 3/1284* (2013.01); *C02F 3/206* (2013.01); *C02F 2209/04* (2013.01); *C02F 2209/14* (2013.01); *C02F 2209/15* (2013.01); *C02F 2209/18* (2013.01); *C02F 2209/40* (2013.01); *Y02W 10/15* (2015.05)

(58) Field of Classification Search
CPC .......... C02F 3/006; C02F 3/20; C02F 3/1284; C02F 3/301; C02F 2209/04; C02F 2209/14; C02F 2209/15; C02F 2209/18; C02F 2209/40; C02F 3/1257; C02F 3/206; Y02W 10/15
USPC ....... 210/605, 614, 623, 630, 903, 906, 143, 210/221.1, 221.2, 252
See application file for complete search history.

(56) References Cited

U.S. PATENT DOCUMENTS

| | | | | |
|---|---|---|---|---|
| 4,634,526 A | * | 1/1987 | Salkeld | B01D 21/00 210/194 |
| 4,643,830 A | * | 2/1987 | Reid | C02F 3/1257 210/194 |
| 4,869,818 A | * | 9/1989 | DiGregorio | B01F 3/04773 210/194 |

(Continued)

*Primary Examiner* — Freddie G Prince, Jr.
(74) *Attorney, Agent, or Firm* — R. Neil Sudol; Henry D. Coleman

(57) ABSTRACT

An orbital wastewater treatment system includes a tank assembly, at least one impeller, at least one flow-diversion mechanism, at least one actuator, optionally at least one sensor disposed in the tank assembly, and a control unit. The tank assembly has three treatment zones and pairs of passages between the first zone and the second zone and between the second zone and the third zone. The impeller disposed in the tank assembly moves mixed liquor under process about the tank assembly. Multiple flow-diversion mechanisms disposed at the passages between the zones of each pair control process conditions pursuant to a predetermined schedule and/or at least partially in accordance with input from the one or more sensors.

53 Claims, 5 Drawing Sheets

(56) References Cited

U.S. PATENT DOCUMENTS

| | | | | |
|---|---|---|---|---|
| 5,118,415 A | * | 6/1992 | Weis | ............ C02F 3/1257 |
| | | | | 210/194 |
| 5,582,734 A | * | 12/1996 | Coleman | ............ C02F 3/006 |
| | | | | 210/614 |
| 8,057,674 B1 | | 11/2011 | Leland et al. | |
| 8,318,016 B1 | * | 11/2012 | Leland | ............ C02F 3/006 |
| | | | | 210/138 |
| 2013/0256225 A1 | * | 10/2013 | Leland | ............ C02F 3/1284 |
| | | | | 210/629 |

* cited by examiner

ORBITAL WASTEWATER TREATMENT SYSTEM AND METHOD OF OPERATING SAME

CROSS-REFERENCE TO RELATED APPLICATION

This application claims the benefit of U.S. Provisional Patent Application No. 62/055,078 filed 25 Sep. 2014.

BACKGROUND OF THE INVENTION

This invention relates to an orbital wastewater treatment system. This invention also relates to an associated method of operating an orbital wastewater treatment system and to a kit for modifying an existing orbital wastewater treatment system.

In a wastewater process employing an activated sludge process, wastewater impurities including domestic wastes, sugars, lipids, proteins, carbohydrates and other nitrogen- and phosphorus-containing materials are decomposable by microorganisms, as is well known in the art. As the impurities are decomposed, a sludge of settled material and microorganisms is wasted from the process either on a continuous or non-continuous basis. The purpose of sludge wasting is to keep solids from building up in the system. Sludge from the process is normally transported by pumping to a digester for treatment prior to landfill or other disposal so as to reduce the volatile organic content of the sludge, reduce the sludge volume, reduce the pathogenic organisms present in the sludge, reduce its odor potential and improve sludge dewaterability, and for other reasons of lesser importance. Various prior art types of digesters and various digestion and stabilization processes have been proposed and used.

An early circa 1960 installation by Pasveer for wastewater, i.e. primarily sewage, purification by the activated biological sludge method included a closed circuit or ditch with a horizontally-rotated brush rotor used for adding needed oxygen (air) to the sewage and moving the sewage in circulation. In U.S. Pat. No. 3,510,110, an orbital system employing an elongated tank with central partition was disclosed which employed a vertically-rotated surface aerator located at the end(s) of the partition wall for both aerating the sewage and circulating the sewage around the channels formed by the partition wall and the sides of the tank. This latter system has had great commercial success with over 1000 plants in operation world-wide (ranging from less than 1 MGD capacity to one of over 10 million population equivalent) with over 600 plants in operation or in various construction phases since 1976 in the United States up to the present time. Sold under the trademark "Carrousel®", the high popularity of the system is due primarily to its cost-effectiveness, simplicity of design, ease of operation and maintenance, and excellent effluent quality. It can treat raw domestic water to EPA advanced secondary standards without primary clarifiers or effluent filters. With extended aeration, it produces a highly stable water sludge requiring little or no further processing prior to disposal. Carrousel® orbital wastewater treatment systems can be designed to have a power turn-down of 50 to 85 or 90%. Aerator drive horsepower can be varied from 100% of installed capacity to as little as 10% without loss of mixing and continuing sufficient mixed liquor channel velocity. This power turn-down flexibility provides an ability to closely match oxygen input to the mixed liquor to oxygen demand of the microbes acting to degrade the sewage, without loss of mixing and movement. In one of the largest U.S. installations, over 25 MGD of sewage is treated in four units having twenty aerators utilized to aerate and circulate sewage through twenty-four channels formed by twenty partitions and exterior encircling concrete walls forming four tanks.

Improvements in Carrousel® orbital wastewater treatment systems are disclosed in U.S. Pat. Nos. 4,869,818, 4,940,545 and 7,186,332. In general, each Carrousel® orbital wastewater treatment system sold under the trademark denitIR® includes a tank having at least one partition that defines an anoxic zone and an aerobic zone that are operated in accordance with the modified Ludzack-Ettinger (MLE) Process. The partition also defines passages from said aerobic zone to said anoxic zone and from said anoxic zone to said aerobic zone. At least one impeller/aerator is located in said tank for moving mixed liquor under process about said tank and for increasing the dissolved oxygen content of the liquor in the aerobic zone. A manually adjustable flow-diversion gate is provided at the passage for controlling the recycling of nitrates to the anoxic zone from the aerobic zone. The aerator is efficient in oxygen transfer and mixing so as to maintain solids in suspension while varying oxygen input so that the main channel flow reaches an anoxic condition as it passes the flow-diversion gate. In the anoxic basin or zone, screened and degritted influent and recycled activated sludge are mixed with nitrified mixed liquor, providing optimized conditions for high rate denitrification, pursuant to the MLE Process. Bacteria feed on the carbon-rich influent, using molecular oxygen from the abundant nitrate to drive metabolic reactions. Nitrate is first reduced to nitrite, then to nitrogen gas, which is subsequently stripped in the aeration basin. In the process, portions of the alkalinity and oxygen consumed during nitrification are restored.

OBJECTS OF THE INVENTION

An object of the present invention is to provide an improved orbital wastewater treatment system and/or an improved method for operating an orbital wastewater treatment system.

Another object of the present invention is to provide such an improved orbital wastewater treatment system that is easier and more efficient to operate.

These and other objects of the invention will be apparent from the drawings and descriptions herein. Although each of the objects of the invention is believed to be attained in at least one embodiment of the invention, there is not necessarily any one embodiment that achieves all of the objects of the invention.

SUMMARY OF THE INVENTION

The present invention represents an improvement in or modification to the orbital wastewater treatment system and method disclosed and claimed in U.S. Pat. No. 8,057,674. The invention contemplates an orbital wastewater treatment system configured to operate with three treatment zones. More specifically, an orbital wastewater treatment system in accordance with the present invention typically comprises a tank with a first treatment zone that is an anoxic zone convertible into an anaerobic zone, a second treatment zone that is an aerobic zone a portion of which may be converted at least partially into an anoxic zone, depending on operating conditions, and a third treatment zone convertible between an anoxic zone and an aerobic zone. The zones are defined in part by tank partitions and in part by active ancillary structures such as (i) one or more flow-diversion gates in passages between the first treatment zone and the second treatment zone and between the second treatment zone and the third treatment zone, (ii) air diffusers such as aeration strips disposed in the first treatment zone, the third treatment zone, or both, and (iii) one or more mixers disposed in the first treatment zone, the second treatment zone, the third treatment zone, or some combination of zones. Preferably, the flow-diversion gates are automatically operated by a control unit pursuant to programming that takes into account such parameters as times and degrees of gate closure and the concentrations of chemical constituents as measured by one or more sensors disposed in the tank. It is also preferable that the air diffusers, if any, are automatically operated by the control unit pursuant to similar programming, responsive to such parameters as times and degrees of gate closure and aeration as well as the concentrations of chemical constituents as measured by one or more sensors disposed in the tank. The operation of the system, including the times and degrees of gate closure and the operating periods and flow rates of the air diffusers, if any, also partially determines the operating conditions of the three treatment zones.

An orbital wastewater treatment system in accordance with the present invention comprises a tank assembly having at least a first treatment zone, a second treatment zone and a third treatment zone, the tank assembly having at least two passages between the first treatment zone and the second treatment zone and at least two second passages between the second treatment zone and the third treatment zone. At least one impeller is disposed in the tank assembly for moving mixed liquor under process about the tank assembly and through the passages. Preferably, the system further comprises at least one flow diversion mechanism, which is disposed at one of the first passages and the second passages. An actuator is operatively connected to the flow-diversion mechanism. Preferably a control unit is operatively connected to the actuator for automatically regulating or adjusting a flow state or configuration of the flow-diversion mechanism.

The flow-diversion mechanism may be a first flow-diversion mechanism disposed at at least one of the first passages, i.e., between the first treatment zone and the second treatment zone. A second flow-diversion mechanism may be disposed at at least one of the second passages, that is, between the second treatment zone and the third treatment zone. The flow-diversion mechanisms are provided with respective actuators both operatively connected to the control unit which is configured to regulate or adjust a flow states or configurations of the multiple flow-diversion mechanisms.

In some particular embodiments of the present invention, a third flow-diversion mechanism disposed is at another of the second passages, between the second treatment zone and the third treatment zone. The third flow-diversion mechanism is actuated by a third actuator responsive to the control unit.

As mentioned above the system may include one or more air diffusers or diffused air injection elements disposed in at least one of the first treatment zone and the third treatment zone. The air diffusers may be operated to enhance phosphorus uptake after a release thereof. Where an anoxic/anaerobic zone (mainly first treatment zone) includes at least a first stage and a second stage, the aeration elements or diffusers may be disposed only in the second or downstream stage of the treatment zone.

The system may further comprise one or more mixers disposed in the first treatment zone and/or the third treatment zone. Where air diffusers are provided in the first treatment zone or the third treatment zone, mixers are preferably included as well. A mixer is generally disposed in the first treatment zone. The control unit may be connected to the mixer(s) for alternately activating and deactivating the mixer(s) upon changes in state of the flow-diversion mechanism(s).

The control unit is operatively connected to the impeller (generally disposed in the second treatment zone) and the diffused air injection elements and is configured to operate the impeller and the diffused air injection element to reduce energy usage. The control unit may be programmed to monitor energy usage, e.g., via inputs that encode the power used by the impeller and the power used by the aerators (e.g., blowers), to compare total energy usage with the operating conditions, and to determine impeller and aerator power combinations that reduce the total amount of power used for one or more specific operating configurations. The reduced power combinations are then used in future occurrences of the operating conditions. Alternatively, the control unit may be preprogrammed to simply vary the rate of rotation of the impeller and the rate of air flow by the blower(s) in accordance with the time of day, total throughput and other operating parameters.

In at least one embodiment at least one weir is provided which communicates with the third treatment zone. The third treatment zone may be operated in that case as a final treatment zone. In the case of storm or flood conditions, the flow-diversion gate between the second treatment zone and the third treatment zone is closed (thereby blocking all but incidental flow between the two zones) and any air diffusers and mixers in the third treatment zone are deactivated, thereby facilitating a flow of effluent into the weirs and to the clarifier with minimum solid particle entrainment.

Where the third treatment zone is provided with influent and/or RAS feed, the weirs are not provided at the third treatment zone but instead are provided at the second treatment zone.

Pursuant to another feature of the present invention, the system additionally comprises at least one sensor. That sensor is disposed in the tank and the control unit is operatively connected to the sensor and the actuator(s) for regulating a flow state or configuration of the flow-diversion mechanism(s) at least partially in accordance with input from the sensor.

The control unit may be configured or programmed to adjust at least one of the flow-diversion mechanisms, for example, a flow-diversion mechanism between the first treatment zone and the second treatment zone or between the second treatment zone and the third treatment zone, to one of two opposed extreme flow states or configurations upon an earlier to occur of (i) a lapse of a predetermined time period after adjusting of the flow-diversion mechanism from the one extreme flow state or configuration and (ii) a detection by the sensor of a predetermined magnitude of a preselected control parameter in one of the first treatment zone and the second treatment zone.

The extreme states or configurations of the adjusted flow-diversion mechanism are generally a configuration allowing maximum liquor flow and a configuration minimizing liquor flow between two treatment zones. For example, the extreme states or configurations may be a fully opened configuration and a fully closed configuration of the flow-diversion mechanism.

The sensor is typically a phosphorus (P) sensor, an oxidation reduction potential (ORP) sensor, a dihydride nicotinamide adenine dinucleotide (NADH) sensor, an NO$_3$—N sensor, an ammonia (NH$_3$—N) sensor, a dissolved oxygen (DO) sensor, or a velocity sensor. Accordingly, the control parameter measured by the sensor is typically a phosphorus concentration (as in phosphorus acid), an oxidation reduction potential, an NADH concentration, an NO$_3$—N concentration, an ammonia concentration, a dissolved oxygen concentration, or a mixed liquor velocity (ft/sec).

In one specific embodiment of the present invention, where the first treatment zone is an anoxic/anaerobic zone and the second treatment zone is an aerobic/anoxic zone and where the flow-diversion mechanism is in a passage between the first treatment zone and the second treatment zone, the one extreme state or configuration is an at least partially closed configuration at least partially blocking liquor flow from the second zone to the first zone during an anaerobic treatment phase in the first zone. In this one specific embodiment, the one sensor may be a nitrate sensor disposed in the second treatment zone (aerobic/anoxic), with the control unit being programmed to at least partially close the flow-diversion mechanism, and at least inhibit mixed liquor flow from the second treatment zone to the first treatment zone, in response to detection via the sensor of a drop in nitrate content to a predetermined level. Optionally, the control unit is programmed to substantially close the flow-diversion mechanism, thereby substantially preventing liquor flow from the second zone to the first zone, in response to detection via the sensor of a drop in nitrate content in the second zone to a predetermined level.

In another alternative or supplemental embodiment of the present invention, where the third treatment zone is an anoxic/aerobic zone and the second treatment zone is an aerobic/anoxic zone and where the flow-diversion mechanism is in a passage between the third treatment zone and the second treatment zone, the one extreme state or configuration may be a substantially closed configuration blocking all but incidental liquor flow from the second zone to the first zone during an aeration treatment phase in the third zone. In this one specific embodiment, the one sensor may be an ORP or a nitrate sensor disposed in the third treatment zone (aerobic/anoxic), with the control unit being programmed to at least partially open the flow-diversion mechanism, and enable mixed liquor flow from the third treatment zone to the second treatment zone, to thereby flush unconverted nitrates from the third zone into the second zone, in response to detection via the sensor of a nitrate content at or a predetermined level. Optionally, the control unit is programmed to periodically open the normally closed flow-diversion mechanism based on timers or sensors, to permit nitrate flushing into the second treatment zone from the third treatment zone.

Multiple sensors may be disposed in any one or all of the treatment zones. If, for example, a phosphorus, ORP, or NADH sensor is disposed in the first treatment zone, the control unit is optionally programmed to at least partially open the appropriate flow-diversion mechanism to allow mixed liquor flow from the second treatment zone to the first treatment zone in response to detection via the sensor of a change in the measured parameter. Generally, at least some flow exists at all times from the first treatment zone to the second treatment zone.

The control unit may be further programmed to periodically and incrementally adjust the flow-diversion mechanism(s) based on values of one or more parameters as detected by the sensor(s).

As discussed above, the control unit may be programmed to maintain the flow-diversion mechanism between the first treatment zone and the second treatment zone or a flow-diversion mechanism between the third treatment zone and the second treatment zone in one extreme state or configuration (e.g., closed) for a predetermined time period and to adjust the flow-diversion mechanism from that one extreme state or configuration after termination of the predetermined time period. More generally, the control unit may be programmed to adjust the flow states or configurations of the flow-diversion mechanisms at least partially in accordance with a predetermined schedule of operation.

The control unit may be also programmed to adjust any given flow-diversion mechanism from one state or configuration upon an earlier to occur of (i) a lapse of the predetermined time period after adjusting of the flow-diversion mechanism to the one state or configuration and (ii) an automated detection of a predetermined magnitude of a preselected control parameter in one of the treatment zones. Accordingly, control of the flow states or configurations of the flow-diversion mechanisms may be based on both a schedule and on sensor input.

According to an optional feature of the present invention, the system may include at least one input conduit extending to the first treatment zone and the third treatment zone for delivering influent to the first treatment zone and the third treatment zone. The rate of influent to either one or both zones may be variable, for instance, via valve actuation preferably by the control unit. The influent feed conduit may additionally extend to the second treatment zone, for use generally only during storms or flood conditions.

Additionally, the system may include at least one other input conduit extending to the first treatment zone and/or the third treatment zone for delivering recycled activated sludge (RAS) to the first treatment zone and/or the third treatment zone. The rate of RAS to either one or both zones may be variable, for instance, via valve actuation preferably by the control unit.

Where the system includes at least one input conduit extending to the tank for delivering recycled activated sludge and influent to the first treatment zone, an additional flow-diversion mechanism may be operatively connected to the control unit for regulating flow of recycled activated sludge and influent to the first treatment zone at least partially in accordance with input from the sensor. Where the first treatment zone includes a first stage and a second stage, the input conduit may include a first branch extending to the first stage and a second branch extending to the second stage. In that case, the control unit is programmed to direct incoming influent and recycled activated sludge alternately to the first stage and the second stage at least partially in accordance with input from the sensor.

According to yet another feature of the present invention, one or more additional sensors may be disposed any one or all of the first treatment zone, the second treatment zone and the third treatment zone, the additional sensors also being connected to the control unit for informing control operations thereof. The additional sensors may be a phosphorus (P) sensor, an oxidation reduction potential (ORP) sensor, a dihydride nicotinamide adenine dinucleotide (NADH) sensor, an NO$_3$—N sensor, an ammonia (NH$_3$—N) sensor, a dissolved oxygen (DO) sensor, or a velocity sensor.

The present invention is also directed to a method for operating an orbital wastewater treatment system, the system including a tank assembly with at least a first treatment zone, a second treatment zone and a third treatment zone, the tank assembly having at least two passages between the first treatment zone and the second treatment zone and at least two second passages between the second treatment zone and the third treatment zone. The method comprises energizing at least one impeller in the tank assembly to move mixed liquor about the tank assembly and automatically adjusting a flow state or configuration of a flow-diversion mechanism at at least one of the passages to modify a flow of mixed liquor between the second treatment zone and one of the first treatment zone and the third treatment zone.

Where the flow-diversion mechanism is a first flow-diversion mechanism disposed at at least one of the first passages and the system further includes a second flow-diversion mechanism disposed at at least one of the second passages, the method further comprises automatically adjusting a flow state or configuration of the second flow-diversion mechanism to modify the flow of mixed liquor between the third treatment zone and the second treatment zone.

The first and the second flow-diversion mechanism may be operated to cycle each of first treatment zone, the second treatment zone and the third treatment zone to aerobic conditions.

The method may additionally comprise automatically adjusting the flow state or configuration of at least the second flow-diversion mechanism so that the third treatment zone operates as a recirculation zone.

Where the system includes at least one effluent weir communicating with the third treatment zone, the method may further comprise automatically adjusting the flow state or configuration of at least the second flow-diversion mechanism so that the third treatment zone operates as a final treatment stage without recirculation.

The system optionally includes a third flow diversion mechanism disposed in or at another of the second passages. In that case the method further comprises automatically adjusting a flow state or configuration of the third flow-diversion mechanism to further modify the flow of mixed liquor between the second treatment zone and at least the third treatment zone.

The method may further comprise intermittently opening the second flow-diversion mechanism to flush nitrates back into the second treatment zone. The intermittent opening may be time-programmed or responsive to signals from a sensor, such as a nitrate sensor disposed in the third treatment zone.

Where the system includes one or more air diffusers or air injection elements disposed in the first treatment zone and/or the third treatment zone, the method advantageously also comprises operating the impeller and the diffused air injection element to reduce energy usage. The control unit may change the impeller rotation rate and/or the diffuser blow rate pursuant to a preprogrammed schedule or pursuant to a learning protocol where the control unit monitors power usage at various combinations of impeller power usage and diffuser power usage and determines minimum total power usage at each different system operating condition.

Where at least one air diffuser or diffused air injection element is disposed in the first treatment zone or the third treatment zone, it is contemplated that the method further comprises injecting air into the respective treatment zone upon a termination of an aerobic cycle, thereby enhancing phosphorus uptake.

The method may additionally comprise channeling influent to the first treatment zone and the third treatment zone. The rate of influent feed may vary by operating one or more valves in the influent feed channels. In addition, recycled activated sludge (RAS) may be channeled to the first and/or the third treatment zone.

The method may further comprise automatically operating one or more mixers in the first treatment zone and/or the third treatment zone, the impeller being located in the second treatment zone. Typically, the mixers are operated upon an injecting of air into the first treatment zone and/or the third treatment zone via one or more air diffusers or aeration strips. The mixers may be provided even if there are no aeration elements or diffusers.

Pursuant to another feature of the present invention, the automatic adjusting of the flow state or configuration of the flow-diversion mechanism(s) is so performed that in the first treatment zone and/or the third treatment zone, denitrification occurs during a first predetermined period and phosphorus release occurs during a subsequent second predetermined period. Air diffusers may be operated in the first and/or third treatment zone during a third predetermined period for inducing phosphorus uptake.

The second treatment zone may be operated on a dissolved-oxygen set point.

The method may include controlling flow through the third treatment zone so that the third treatment zone swings between an anoxic operating condition and an aerobic operating condition.

The method may further comprise automatically operating at least one sensor at a given location in the tank assembly, the automatic adjusting of the one or more flow-diversion mechanisms being implemented at least partially in accordance with an output of the sensor. The sensor may be a phosphorus (P) sensor, an oxidation reduction potential (ORP) sensor, a dihydride nicotinamide adenine dinucleotide (NADH) sensor, an $NO_3$—N sensor, an ammonia ($NH_3$—N) sensor, a dissolved oxygen (DO) sensor, or a velocity sensor.

In accordance with a further feature of the present invention, the adjusting of the flow-diversion mechanism includes adjusting a given flow-diversion mechanism to one of two states or configurations upon an earlier to occur of (i) a lapse of a predetermined time period after adjusting of the flow-diversion mechanism from the one state or configuration and (ii) a detection by the sensor of a predetermined magnitude of a control parameter in one of the treatment zones. Where the sensor is a phosphorus (P) sensor, an oxidation reduction potential (ORP) sensor, a dihydride nicotinamide adenine dinucleotide (NADH) sensor, an $NO_3$—N sensor, an ammonia ($NH_3$—N) sensor, a dissolved oxygen (DO) sensor, or a velocity sensor, the control parameter is a phosphorus concentration, an oxidation reduction potential, NADH concentration, a nitrate concentration, an ammonia concentration, a dissolved oxygen concentration, or a velocity, respectively. The flow-diversion mechanism may be disposed between the second treatment zone and the first treatment zone or between the third treatment zone and the second treatment zone. In the latter case, the flow-diversion gate is maintained mainly in a closed position, except for a few minutes at regular or irregular intervals to enable nitrate flushing from the third treatment zone to the second treatment zone. In such a mode of operation the entire system acts as two reactors in series, with concomitant reductions in space and energy usage, and enhanced operating efficiencies.

In accordance with another feature of the present invention, the adjusting of the given flow-diversion mechanism includes maintaining the given flow-diversion mechanism in the one of the two states or configurations for a predetermined additional time period and adjusting the flow-diversion mechanism from the one of the two states or configurations after termination of the additional time period.

The flow-diversion adjustment may also include periodically and incrementally adjusting any one of the flow-diversion mechanisms, for instance, from a partially open position to a fully closed position.

The adjusting of a given one of the flow-diversion mechanisms may further include adjusting the flow-diversion mechanism from the one of the two states or configurations upon an earlier to occur of (i) a lapse of a predetermined additional time period after adjusting of the flow-diversion mechanism to the one states or configurations and (ii) an automated detection of a predetermined magnitude of a preselected control parameter in one of the three treatment zones.

Where the first treatment zone is an anoxic zone convertible into an anaerobic zone and the second treatment zone is an aerobic zone partially convertible into an anoxic zone and the given flow-diversion mechanism is located between the first and the second treatment zones, the one of the two states or configurations is a closed or partially closed state or configuration inhibiting or preventing flow between the first treatment zone and the second treatment zone.

Where the third treatment zone is convertible between an anoxic zone and an anaerobic zone and the second treatment zone is an aerobic zone partially convertible into an anoxic zone and the given flow-diversion mechanism is located between the third and the second treatment zones, the one of the two states or configurations is a substantially closed state or configuration essentially preventing flow between the third treatment zone and the second treatment zone.

Where recycled activated sludge and influent is delivered to the first treatment zone (e.g., an anoxic/anaerobic zone), the method may, but need not, include automatically regulating flow of recycled activated sludge and influent to the anoxic/anaerobic zone at least partially in accordance with a detected magnitude of the control parameter at the given location in the tank assembly. Where the anoxic/anaerobic zone includes at least a first stage and a second stage, the regulating of flow of recycled activated sludge and influent to the anoxic/anaerobic zone may include directing incoming influent and recycled activated sludge alternately to the first stage and the second stage at least partially in accordance with the detected magnitude of the control parameter.

The present invention contemplates a kit (a coordinated collection of components) for modifying a new orbital wastewater treatment tank assembly or retrofitting an existing orbital wastewater treatment tank assembly having at least a first treatment zone (e.g., an anoxic/anaerobic zone) and a second treatment zone (e.g., an aerobic/anoxic zone), and at least two passages between the two zones. The kit comprises at least one partition for installation in the tank to create a compartment for the third treatment zone and at least one actuator operatively connectable to a flow-diversion mechanism disposed in the tank assembly at a passage between the first treatment zone and the second treatment zone or between the second treatment zone and the third treatment zone, and a control unit operatively connectable to the actuator for regulating a position or operating state of the flow-diversion mechanism. The kit may include multiple flow-diversion mechanisms and associated actuators operatively connectable to the control unit.

Pursuant to another feature of the present invention, the kit includes one or more air diffusers or aerators and associated hardware for operationally installing the diffusers or aerators in the first treatment zone and/or the third treatment zone. Also, the kit may include one or more mixers and associated components for operationally installing the mixers in the first treatment zone and/or the third treatment zone.

Pursuant to another feature of the invention, the kit may additionally include at least one sensor disposable in the tank assembly, the control unit operatively being connectable to the sensor and the actuator for regulating a position of the one or more flow-diversion mechanisms at least partially in accordance with input from the sensor. The sensor may be a phosphorus (P) sensor, an oxidation reduction potential (ORP) sensor, a dihydride nicotinamide adenine dinucleotide (NADH) sensor, an $NO_3$—N sensor, an ammonia ($NH_3$—N) sensor, a dissolved oxygen (DO) sensor, or a velocity sensor.

The control unit of the kit may be programmed to adjust at least one of the flow-diversion mechanisms to one of two flow states or configurations upon an earlier to occur of (i) a lapse of a predetermined time period after moving of the flow-diversion mechanism from the one flow state or configuration and (ii) a detection by the sensor of a predetermined magnitude of a control parameter in one of the three treatment zones.

The kit's control unit may be further programmed to maintain the at least one flow-diversion mechanism in the one of the two states or configurations for a predetermined additional time period and adjust the at least one flow-diversion mechanism from the one of the two states or configurations after termination of the additional time period.

The kit's control unit may be additionally programmed to periodically and incrementally adjust any one or all of the flow-diversion mechanisms. More generally, the kit's control unit may be programmed to adjust the flow state or configuration of any one or all of the flow-diversion mechanisms in accordance with a predetermined schedule.

The control unit may be also programmed to adjust the at least one flow-diversion mechanism from the one of the two states or configurations upon an earlier to occur of (i) a lapse of a predetermined additional time period after moving of the at least one flow-diversion mechanism to the one of the two states or configurations and (ii) an automated detection of a predetermined magnitude of a preselected control parameter in one of the three treatment zones.

The control unit may be programmed as well to maintain any one or all of the flow-diversion mechanisms, upon a closing thereof, in a closed state or configuration for a predetermined period of time and to open the flow-diversion mechanism(s) after termination of the period of time.

The kit may include at least one additional sensor taken from the group consisting of a phosphorus (P) sensor, an oxidation reduction potential (ORP) sensor, a dihydride nicotinamide adenine dinucleotide (NADH) sensor, an $NO_3$—N sensor, an ammonia ($NH_3$—N) sensor, a dissolved oxygen (DO) sensor, and a velocity sensor. A dissolved oxygen sensor is also typically disposed in the second treatment zone realized as an aerobic zone convertible at least partially to an anoxic zone.

The kit may further comprise one or more additional flow-diversion mechanisms operatively connectable to the control unit for regulating flow of recycled activated sludge and influent to the first treatment zone and/or the third treatment zone at least partially in accordance with input from the sensor.

The present invention optimizes the removal of nitrogen and/or phosphorus in an activated sludge system that incorporates an anoxic/anaerobic zone communicating with an aerobic/anoxic zone via internal recycle bypass channels or passages. Optimization includes increasing operating throughput per unit space and increasing throughput per unit of energy.

DETAILED DESCRIPTION

The present invention presents improvements in or modifications to the orbital wastewater treatment system and method discussed below with reference to FIGS. 1-5 and disclosed in U.S. Pat. No. 8,057,674. The modifications and improvements are discussed with reference to FIGS. 6-9.

Figure 1:
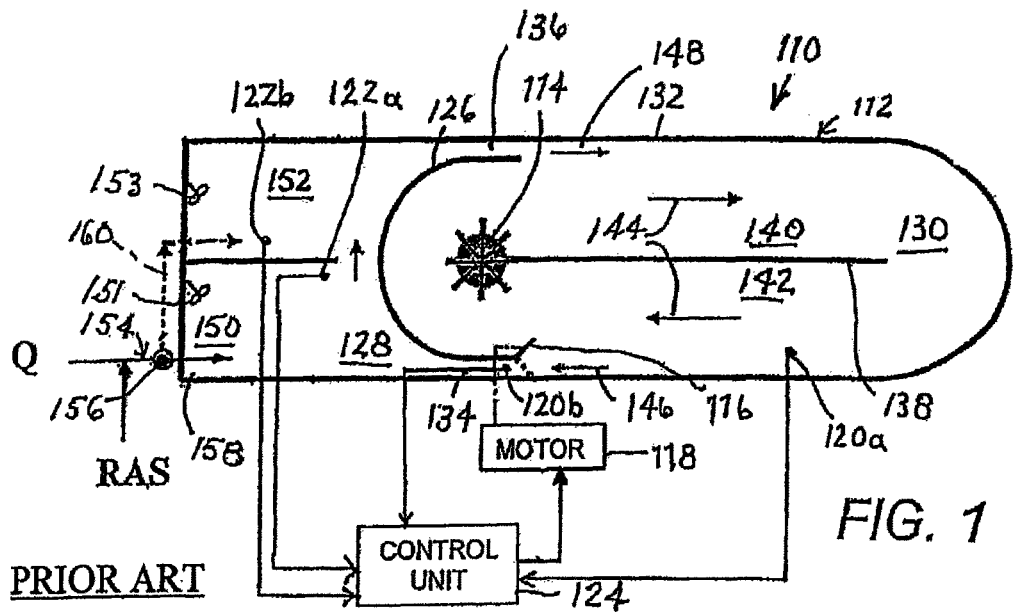
FIG. 1 is a diagram of an orbital wastewater treatment system with automated flow diversion.

As depicted in FIG. 1, an orbital wastewater treatment system 110 comprises a tank 112, a rotary impeller/aerator 114, a flow-diversion mechanism in the form of a gate 116, an actuator in the form of a motor 118, a plurality of sensors 120a, 120b, and 122a, 122b, and a control unit 124. Tank 112 has an arcuate or semi-cylindrical partition 126 dividing the tank into a first treatment zone 128 and a second treatment zone 130. Zone 128 is typically an anoxic zone that may be converted into an anaerobic zone depending on operating conditions, while zone 130 is typically an aerobic zone that may be partially converted to an anoxic zone, again depending on operating conditions.

Partition 126 further defines, together with an external wall 132 of tank 112, a first passage 134 from aerobic/anoxic zone 130 to anoxic/anaerobic zone 128 and a second passage 136 from the anoxic/anaerobic zone to the aerobic/anoxic zone. Tank 112 further includes a planar partition or wall 138 separating aerobic zone 130 into a pair of parallel track sections 140 and 142. As indicated by arrows 144, impeller/aerator 114 propels or moves an oxygenated wastewater slurry or mixed liquor about an oval track (not separately designated) consisting largely of track sections 140 and 142.

An arrow 146 indicates a controllably intermittent stream of mixed liquor moving through passage 134, the liquor stream being low in dissolved oxygen and high in oxidized nitrogen-containing compounds owing to a nitrification reaction within aerobic zone 130. Another arrow 148 indicates a second, possibly intermittent, stream passing from treatment zone 128 to treatment zone 130 through passage 136, this second stream being low in oxidized nitrogen-containing compounds owing to a two-stage bacteria-mediated denitrification removal reaction in anoxic/anaerobic zone 128. In addition, when zone 128 is operated intermittently as an anaerobic zone, conditions occur that promote biological phosphorus release and subsequent removal.

Flow-diversion gate 116 is disposed at passage 134 for alternately permitting and blocking (or impeding) the flow of stream 146 from aerobic/anoxic zone 130 to anoxic/anaerobic zone 128. Motor 118 is operatively connected to gate 116 for controlling the position or degree of closure thereof in response to a signal from control unit 124.

Sensor 120a is disposed in aerobic/anoxic zone 130, while sensors or detectors 122a and 122b are disposed in compartments 150 and 152 of zone 128. Sensor 120a is a nitrate sensor, a dissolved oxygen sensor, an ammonia sensor, and/or an ORP sensor while sensors 122a and 122b are nitrate sensors, NADH (dihydride nicotinamide adenine dinucleotide) sensors, orthophosphate sensors or ORP sensors. Alternatively, sensors 122a and 122b may be eliminated, with control being solely by a timer. Sensor 120b is an optional velocity sensor. Control unit 124 is operatively connected to sensors 120a, 120b, 122a, 122b (as installed) and motor 118 for regulating a position of flow-diversion gate 116 at least partially in accordance with input from the sensors.

Conventional mixers 151 and 153 are provided in stages or compartments 150 and 152 for enhancing the efficiency of the denitrification and phosphorus release processes. It is possible to alter the operating state of mixers 151 and 153 in accordance with changes in the flow state or configuration of gate 116 and/or changes in one or more sensed process parameters. Specifically, mixer 151 and/or 153 may be actuated from the on position to the off position or from the off position to the on position in accordance with a predetermined position change of the flow diversion gate 116 or by a detection by the sensor of a predetermined magnitude of a preselected control parameter. For example, control unit 124 may be operatively to mixer 151 and/or 153 to turn the mixer(s) off when the gate 116 closes and to activate the mixer(s) with the gate opens. This synchronicity results in improved phosphorus release.

The control units of the present treatment systems, each exemplarily including a microprocessor, are programmed to move the respective flow-diversion gates to one of two opposed extreme positions upon an earlier to occur of (i) a lapse of a predetermined time period after moving of the gate from that same extreme position and (ii) a detection by one or more sensors of a predetermined magnitude of a control parameter. In the embodiment of FIG. 1, control unit 124 is programmed to move gate 116 to a fully closed position upon an earlier to occur of (i) a lapse of a predetermined time period $\Delta T_1$ (FIG. 5) after an opening of the gate from the fully closed position and (ii) a detection by one or more sensors 120a, 120b, 122a, 122b of a predetermined magnitude of a nitrate concentration, phosphorus concentration, NADH concentration, or ORP level ($\Delta T_y$).

In general, the control units of the present wastewater treatment systems may be further programmed to maintain the flow-diversion gate in the one extreme position for a predetermined additional time period $\Delta T_2$ (FIG. 5) and move the respective gate from the one extreme position after termination of the additional time period $\Delta T_2$. In the embodiment of FIG. 1, after a closing of gate 116, control unit 124 may maintain the gate in the closed position, blocking flow from aerobic/anoxic zone 130 to anoxic/anaerobic zone 128, for predetermined period of time $\Delta T_2$ and to open the gate after termination of that period of time. The predetermined period $\Delta T_2$ may vary from 15 minutes to several hours, depending on the size of tank 112, the nitrogen and phosphorus content of the mixed liquor in anoxic/anaerobic zone 128, the rate of liquor flow through the tank, etc.

Alternatively, as discussed below, control unit 124 may re-open gate 116 after detection of a predetermined set point of a control parameter (e.g., a chemical or biochemical concentration) via sensors 120a, 120b, 122a, 122b. Thus, gate 116 may be opened after a time $\Delta T_x$ (FIG. 5) that is shorter than the predetermined period $\Delta T_2$. Similarly, control unit 124 may close gate 116 after detection of a predetermined set point of a control parameter (e.g., a chemical or biochemical concentration) via sensors 120a, 120b, 122a, 122b. Thus, gate 116 may be closed after a time $\Delta T_y$ (FIG. 5) that is shorter than the predetermined period $\Delta T_1$.

Figure 5:
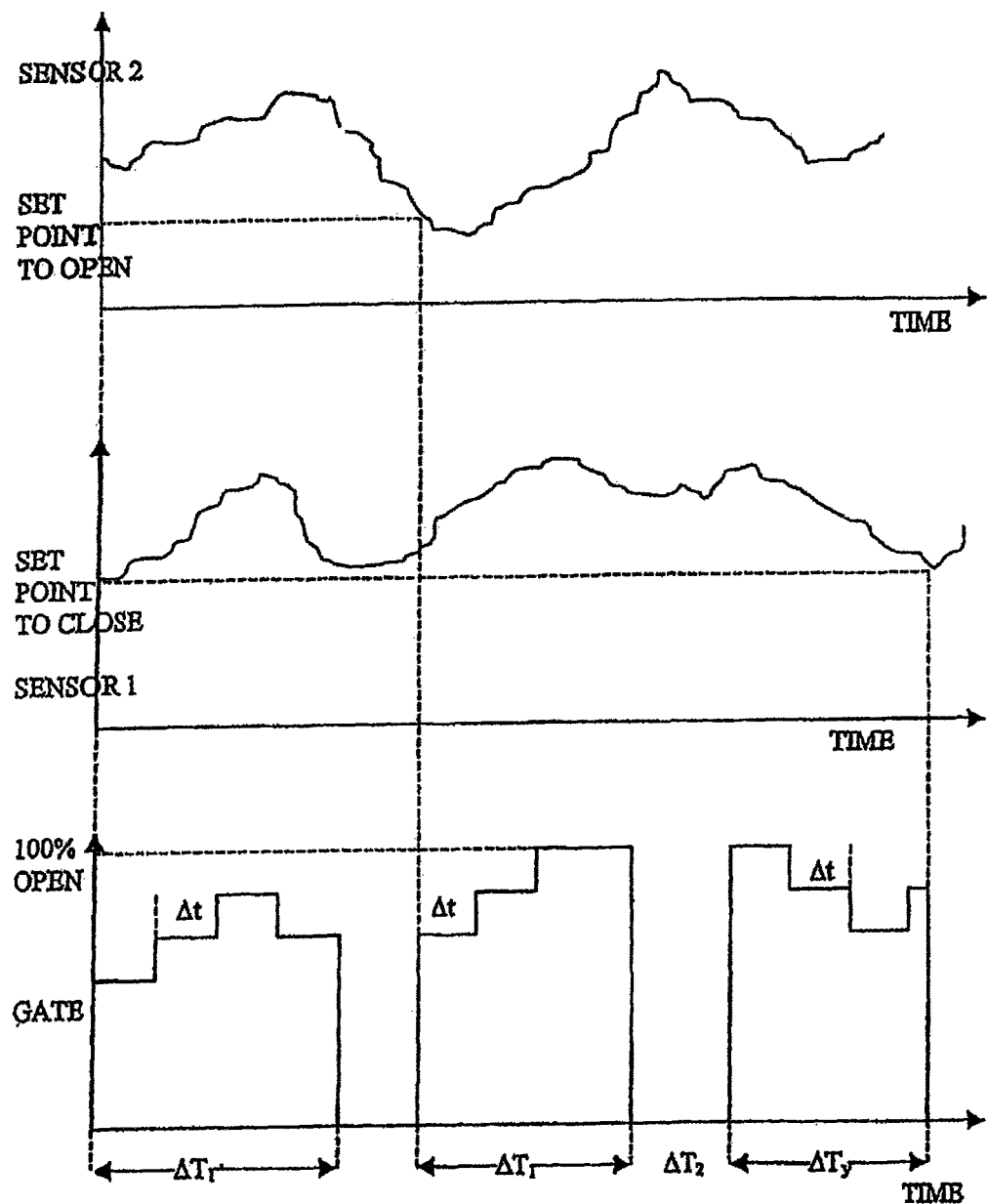
FIG. 5 is a series of three graphs schematically showing outputs of two sensors as a function of time and the position of a flow-diversion gate controlled in part in accordance with the sensors' outputs, in an orbital wastewater treatment system in accordance with the present invention.

The control units of the present wastewater treatment systems may be additionally programmed to periodically and incrementally move the respective gates, for example, in a cycle from a partially open position to a fully closed position, depending on the outputs of sensors 120a, 120b, 122a, 122b (as installed). As graphically depicted in FIG. 5, control unit 124 may move gate 116 periodically, after lapse of a time $\Delta t$, and incrementally in steps of a predetermined magnitude, from a partially open position to a fully open position and subsequently towards the fully closed position. FIG. 5 shows successive positions of gate 116, which is repositioned automatically by control unit 124 after each incremental time period $\Delta t$.

As indicated above, control unit 124 may move gate 116 to the fully closed position after lapse of a preset period $\Delta T_1$ (FIG. 5) commencing with the initial movement of the gate from the fully closed position. In a different operating scenario, control unit may open gate 116 in stepwise fashion from the fully closed position and move the gate back to the fully opened position after lapse of a preset period commencing with the initial movement of the gate from the fully closed position.

Control unit 124 may thus be programmed to move gate 116 from the fully closed position (i.e., to start opening the gate) upon an earlier to occur of (i) a lapse of the predetermined additional time period $\Delta T_2$ after moving of gate 116 to the fully closed position and (ii) an automated detection by one or more sensors 120a, 120b, 122a, 122b of a predetermined magnitude of a nitrate concentration, phosphorus concentration, NADH concentration, ORP level, or mixed liquor velocity, ammonia concentration, dissolved oxygen concentration, or a combination of predetermined magnitudes of a plurality of chemical components.

More specifically, control unit 124 is configured to at least partially close flow-diversion gate 116, and at least inhibit the flow of mixed liquor stream 146 from aerobic/anoxic zone 130 to anoxic/anaerobic zone 128, in response to detection via sensor 120a of a drop in nitrate content in aerobic/anoxic zone 130 to a predetermined level. In that case, control unit 124 is programmed to substantially close flow-diversion gate 116, thereby substantially preventing the flow of mixed liquor stream 146 from aerobic/anoxic zone 130 to anoxic/anaerobic zone 128, in response to detection via the sensor of a drop in nitrate content in the aerobic/anoxic zone.

Control unit 124 may be further programmed to adjust the position of flow-diversion gate 116 and concomitantly the rate of flow of mixed liquor stream 146 through passage 134 to anoxic/anaerobic zone 128, in accordance with further sensor input, including NADH, ORP, ammonia, dissolved oxygen or phosphate content or mixed liquor velocity as measured by sensors 120a, 120b, 122a, 122b. For example, control unit 124 may be also programmed to at least partially open flow-diversion gate 116 and allow the flow of mixed liquor stream 146 from aerobic/anoxic zone 130 to anoxic/anaerobic zone 128 in response to the detection by sensor 122a of a change in ORP, phosphorus, or NADH concentration to a predetermined level.

As shown in FIG. 1, at least one input conduit 154 extends to tank 112 for delivering recycled activated sludge RAS and influent Q to anoxic/anaerobic zone 128. Optionally, an additional gate or two-way valve 156 may be operatively connected to control unit 124 and disposed in input conduit 154 for regulating flow of recycled activated sludge RAS and influent Q to anoxic/anaerobic zone 128 at least partially in accordance with input from sensors 122a, 122b. Conduit 154 may include a first branch 158 extending to first stage 150 of anoxic/anaerobic zone 128 and a second branch 160 extending to second stage 152. Control unit 124 may be programmed in that case to direct incoming influent and recycled activated sludge alternately to stages 150 and 152 at least partially in accordance with input from sensors 122a, 122b.

The closure or substantial closure of gate 116 results in an anaerobic/fermentation environment to promote the release of phosphorus. Generally, upon the closure of flow-diversion gate 116, control unit 124 may additionally operate optional two-way valve 156 to divert incoming recycled activated sludge RAS and influent Q to downstream stage 152 of anoxic/anaerobic zone 128. To promote denitrification, two-way valve 156 and flow-diversion gate 116 are returned to their original positions feeding incoming recycled activated sludge RSA and influent Q to upstream stage 150 of anoxic/anaerobic zone 128 and permitting substantial flow of mixed liquor stream 146 from aerobic/anoxic zone 130 to anoxic/anaerobic zone 128. Cycling of the anoxic and anaerobic environments in anoxic/anaerobic zone 128 and concomitantly of flow-diversion gate 116 and two-way valve 156 is a function of the nitrate concentration and the NADH, ORP, and/or phosphorus concentration, mixed liquor velocity, and/or dissolved oxygen concentration, as measured by sensors 120a, 120b, 122a, 122b.

During operation of the orbital wastewater treatment system 110 of FIG. 1, impeller/aerator 114 is actuated or energized to move mixed liquor about tank 112 and particularly about track 140/142. During an initial part of a denitrification phase, control unit 124 maintains flow-diversion gate 116 in an open position, permitting flow of liquor stream 146 through passage 134 to anoxic/anaerobic zone 128. Control unit 124 also maintains two-way valve 156 in position to direct incoming recycled activated sludge RAS and influent Q to upstream stage 150 of anoxic/anaerobic zone 128. Control unit 124 monitors the state of denitrification in aerobic/anoxic zone 130 by means of sensor 120a. Upon detecting that nitrate levels have fallen to a predetermined low level, control unit 124 energizes motor 118 to automatically reposition flow-diversion gate 116 to close off passage 134 and operates two-way valve 156 to direct incoming recycled activated sludge RAS and influent Q to downstream stage 152 of anoxic/anaerobic zone 128. As indicated above, control unit 124 may store, in memory or an internal register, a value of a predetermined period of time and start a timer or monitor an internal clock to ascertain the elapse of that period of time after the repositioning of flow-diversion gate 116 and two-way valve 156. After the period of time has passed, control unit 124 then sets flow-diversion gate 116 back to an open position, allowing the flow of mixed liquor stream 146 from aerobic/anoxic zone 130 to anoxic/anaerobic zone 128 via passage 134. At the same time, control unit 124 resets two-way valve 156 to direct incoming recycled activated sludge RAS and influent Q to upstream stage 150 of anoxic/anaerobic zone 128.

Figure 2:
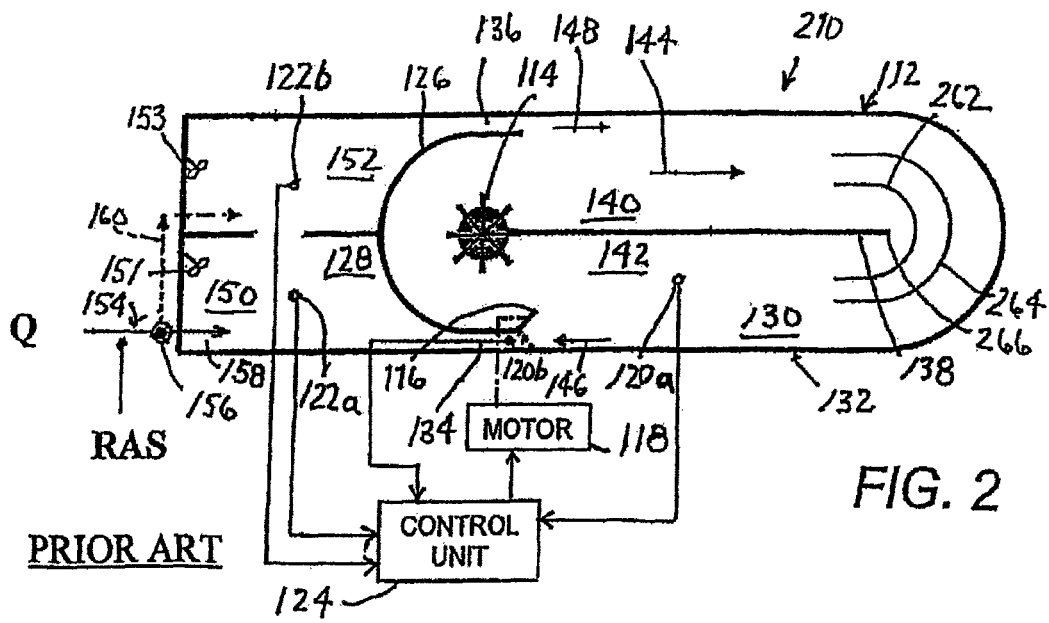
FIG. 2 is a diagram of a modification of the orbital wastewater treatment system of FIG. 1.

FIG. 2 depicts a modification 210 of the orbital wastewater treatment system of FIG. 1, wherein tank 112 includes one or a plurality of parallel baffles or vanes 262 and 264 at an end of planar partition or wall 138, serving to deflect a mixed liquor stream from track section 140 around an end 266 of partition or wall 138 to track section 142. Alternatively, another aerator (not shown) could be disposed at the end 266 of partition or wall 138, opposite impeller 114 and in place of vanes 262 and 264.

Figure 3:
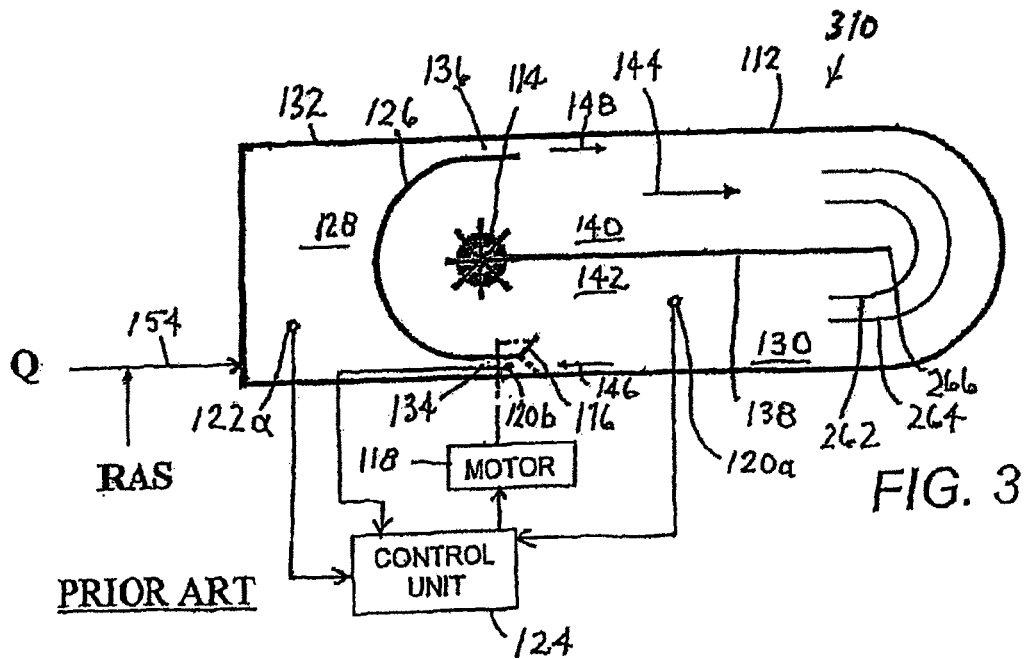
FIG. 3 is a diagram of a further modification of the orbital wastewater treatment system of FIG. 1.

FIG. 3 illustrates a modification 310 of the orbital wastewater treatment system of FIG. 2 wherein anoxic/anaerobic zone 128 comprises a single compartment (not separately labeled) and sensor 122b of FIGS. 1 and 2 is omitted. Owing to the realization of anoxic/anaerobic zone 128 as a single compartment, the modified embodiment 310 of FIG. 3 also omits mixer 153, two-way valve 156, and conduit branch 160 of the embodiments 110 and 210 of FIGS. 1 and 2. Again, another aerator (not shown) could be disposed at the end 266 of partition or wall 138, opposite impeller 114 and in place of vanes 262 and 264.

Figure 4:
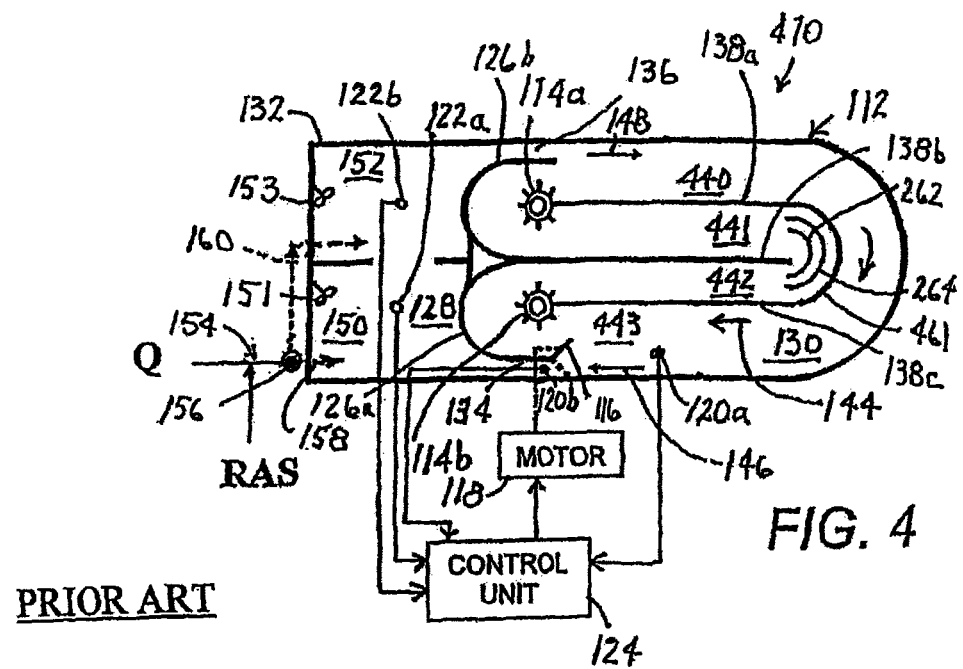
FIG. 4 is a diagram of yet another modification of the orbital wastewater treatment system of FIG. 1.

As depicted in FIG. 4, in yet another modified embodiment 410 of the orbital wastewater treatment system of FIG. 1, tank 112 includes two rotary impellers/aerators 114a and 114b and a pair of arcuate or semi-cylindrical partitions 126a and 126b together dividing the tank into an anoxic/anaerobic zone 128 and an aerobic/anoxic zone 130. Tank 112 further includes three planar partitions or walls 138a, 138b, 138c separating aerobic/anoxic zone 130 into four parallel track sections 440, 441, 442 and 443. As indicated by arrows 444, impellers/aerators 114a and 114b propel or move an oxygenated wastewater slurry or mixed liquor about a snaking track (not separately designated) consisting largely of track sections 440-443. An arcuate or cylindrical partition or wall 461 connects planar partitions or walls 138a and 138c. Baffles or vanes 262 and 264 are provided at an end of planar partition or wall 138b and serve, together with partition 461, to deflect a mixed liquor stream from track section 442 around an end of partition or wall 138b to track section 442. Another aerator (not shown) could be disposed at the end of partition or wall 138b, in place of vanes 262 and 264.

Modified embodiments 210, 310 and 410 of an orbital wastewater treatment system all have liquor flow control as discussed above with reference to FIGS. 1 and 5.

Various flow control elements of the described embodiments may be included in a kit for modifying new orbital wastewater treatment systems or retrofitting existing orbital wastewater treatment tanks. Such a kit comprises at least one actuator or motor 118 operatively connectable to a flow-diversion mechanism disposed in the tank 112 between the aerobic/anoxic zone 130 and the anoxic/anaerobic zone 128, and a control unit 124 operatively connectable to the actuator for regulating a flow state or configuration of the flow-diversion mechanism 116.

The control unit may be programmed to control the flow state or configuration of flow-diversion mechanism 116 solely in accordance with a timing schedule. Preferably, however, the kit includes one or more sensors 120a, 120b, 122a, 122b disposable in the tank 112, with the control unit 124 programmed to regulate or adjust the flow state or configuration of the flow-diversion mechanism at least partially in accordance with input from the sensor(s).

The kit typically includes a nitrate sensor 120a disposable in the aerobic/anoxic zone 130. In that event, the kit's control unit 124 is programmed to at least partially close the gate, thereby at least inhibiting mixed liquor flow from the aerobic/anoxic zone 130 to the anoxic/anaerobic zone 128, in response to detection via the sensor of a drop in nitrate content in the aerobic/anoxic zone 130 to a predetermined level. The kit's control unit 124 may be further programmed to maintain the gate 116, upon a closing thereof, in a closed position for a predetermined period of time and to open the gate after termination of the period of time.

The kit may include multiple sensors 120a, 120b, 122a, 122b connectable to the control unit 124. The sensors may include NADH, ORP, phosphorus and/or velocity sensors.

The kit may include an additional gate or two-way valve 156 that is operatively connectable to the control unit 124 for regulating flow of recycled activated sludge and influent to the anoxic/anaerobic zone 128 at least partially in accordance with input from the one or more sensors 122a, 122b. Where the anoxic/anaerobic zone 128 includes a first stage 150 and a second stage 152, the kits control unit 124 may be programmed to direct incoming influent and recycled activated sludge alternately to the first stage 150 and the second stage 152 at least partially in accordance with input from the one or more sensors 122a, 122b. The kit's control unit may be programmed to close the gate or valve 156 for predetermined time periods.

Figure 6:
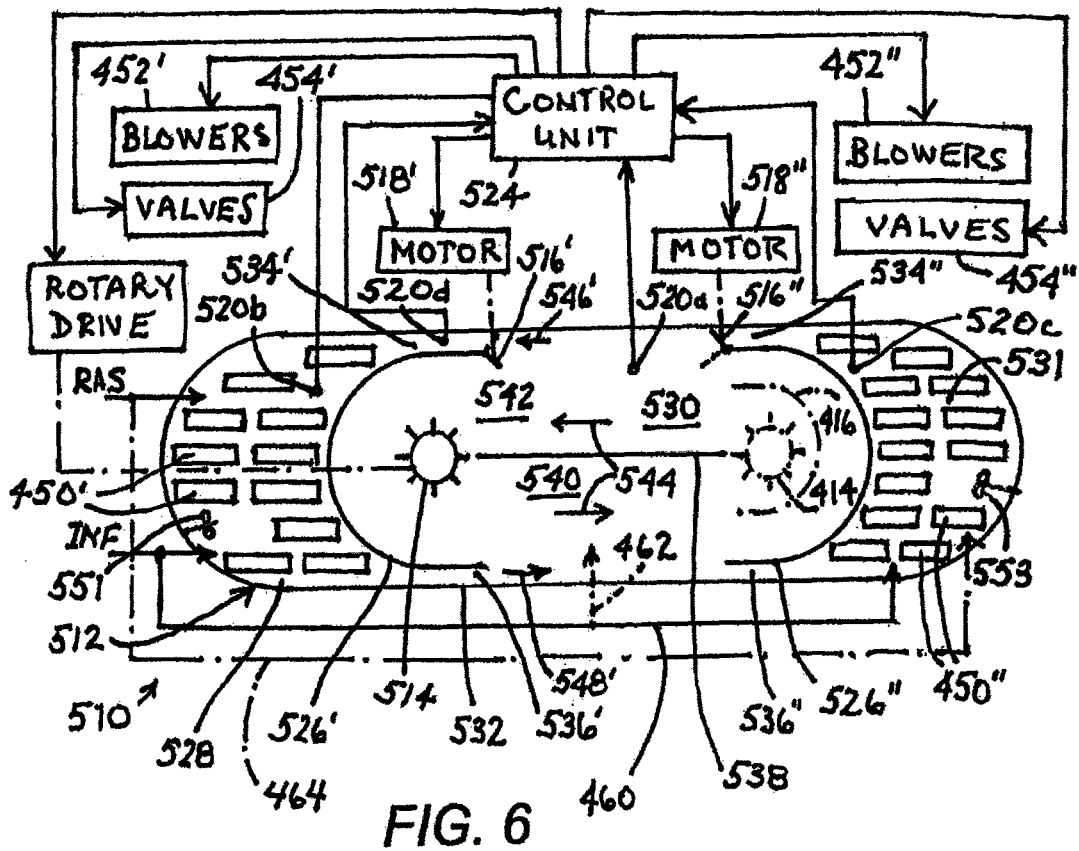
FIG. 6 is a diagram of an orbital wastewater treatment system in accordance with the present invention.

As depicted in FIG. 6, an orbital wastewater treatment system 510 comprises a tank 512, a rotary impeller/aerator 514, a first flow-diversion mechanism and a second flow-diversion mechanism in the form of respective gates 516' and 516", actuators in the form of a motors 518' and 518", a plurality of sensors 520a, 520b, 520c, and 520d, and a control unit 524. Tank 512 has two arcuate or semi-cylindrical partitions 526' and 526" dividing the tank into a first treatment zone 528, a second treatment zone 530, and a third treatment zone 531. Zone 528 is typically an anoxic zone that may be converted into an aerobic zone or an anaerobic zone depending on operating conditions, while zone 530 is typically an aerobic zone that may be partially converted to an anoxic zone, again depending on operating conditions. Zone 531 is convertible between an aerobic zone and an anoxic zone.

System 510 is optionally provided with a second impeller 414 at an end of zone 530 opposite impeller 514. A partially cylindrical baffle or vane 416 may be provided as well.

Partition 526' further defines, together with an external wall 532 of tank 512, two first passages 534' and 536', between aerobic/anoxic zone 530 and anoxic/anaerobic/aerobic zone 528. Partition 526" further defines, together with external tank wall 532, two second passages 534" and 536" between aerobic/anoxic zone 530 and anoxic/aerobic zone 531. Tank 512 further includes a planar partition or wall 538 separating aerobic zone 530 into a pair of parallel track sections 540 and 542. As indicated by arrows 544, impeller/aerator 514 propels or moves an oxygenated wastewater slurry or mixed liquor within treatment zone 530 about an oval track (not separately designated) consisting largely of track sections 540 and 542.

An arrow 546' indicates a controllably intermittent stream of mixed liquor moving through passage 534', the liquor stream being low in dissolved oxygen and high in oxidized nitrogen-containing compounds owing to a nitrification reaction within aerobic zone 530. Another arrow 548' indicates a second, possibly intermittent, stream passing from treatment zone 528 to treatment zone 530 through passage 536', this second stream being low in oxidized nitrogen-containing compounds owing to a two-stage bacteria-mediated denitrification removal reaction in anoxic/anaerobic/aerobic zone 528. Moreover, when zone 528 is operated intermittently as an anaerobic zone, conditions occur that promote biological phosphorus release and subsequent removal. Zone 528 may additionally be operated intermittently as an aerobic zone, promoting further nitrogen release. To that end, zone 528 is provided with air diffusers or aerations strips 450' which are supplied with air by one or more blowers 452' via one or more optional valves 454'. Control unit 524 is connected to blowers 452' and/or valves 454' for controlling the injection of air into zone 528.

Flow-diversion gate 516' is disposed at passage 534' for alternately permitting and blocking (or impeding) the flow of stream 546' from aerobic/anoxic zone 530 to anoxic/anaerobic/aerobic zone 528. Motor 118' is operatively connected to gate 516' for controlling the position or degree of closure thereof in response to a signal from control unit 524.

Flow-diversion gate 516" is disposed at passage 534" for alternately permitting and blocking (or impeding) the flow of stream 546" from aerobic/anoxic zone 531 to aerobic/anoxic zone 530. Motor 118" is operatively connected to gate 516" for controlling the position or degree of closure thereof in response to a signal from control unit 524.

Zone 531 is provided with air diffusers or aerations strips 450" which are supplied with air by one or more blowers 452" via one or more optional valves 454". Control unit 524 is connected to blowers 452" and/or valves 454" for controlling the injection of air into zone 528.

Sensor 520a is disposed in aerobic/anoxic zone 530, while sensor or detector 520b is disposed in zone 528 and sensor or detector 520c is disposed in zone 531. Sensor 520a is a nitrate sensor, a dissolved oxygen sensor, an ammonia sensor, and/or an ORP sensor while sensors 520b and 520c are nitrate sensors, NADH (dihydride nicotinamide andenine dinucleotide) sensors, orthophosphate sensors or ORP sensors. Alternatively, sensors 520b and 520c may be eliminated, with control being solely by a timer. Sensor 520d is an optional velocity sensor. Control unit 524 is operatively connected to sensors 520a, 520b, 520c, 520d (as installed) and motor 518 for regulating a position of flow-diversion gates 516' and 516" at least partially in accordance with input from the sensors.

In one preferred operating scenario, flow-diversion gate 516" is maintained in a substantially closed configuration most of the time and is intermittently opened for a few minutes to flush nitrates from zone 531 into zone 530. The opening and closing of gate 516" may be pursuant to a predetermined time schedule or responsive to a signal from sensor 520c indicating the presence of nitrogen in zone 531.

Conventional mixers 551 and 553 are provided in treatment zones 528 and 531 in large part for enhancing the efficiency of the aeration and denitrification processes. It is possible to alter the operating states of mixers 551 and 553 in accordance with changes in the flow state or configuration of gates 516' and 516", respectively, and/or changes in the operating status of diffusers or aerators 450' and 450" and/or changes in one or more sensed process parameters. Specifically, mixer 551 and/or 553 may be actuated from the on position to the off position or from the off position to the on position in accordance with a pre-determined position change of the flow diversion gates 516' and 516" or by a detection by sensors 520b and 520c (for example) of a predetermined magnitude of a preselected control parameter. For example, control unit 524 may be operatively to mixer 551 or 553 to turn the mixer off when the gate 516' or 516" closes and to activate the mixer(s) when the gate opens.

Control unit 524, exemplarily including a microprocessor, may be programmed to move each flow-diversion gates 516' and 516" to one of two opposed extreme positions upon an earlier to occur of (i) a lapse of a predetermined time period after moving of the gate from that same extreme position and (ii) a detection by one or more sensors of a predetermined magnitude of a control parameter.

In one mode of operation of the embodiment of FIG. 6, control unit 524 keeps gate 516' open for three hours, during which time treatment zone 528 acts as an anoxic zone carrying out a denitrification process. Subsequently, gate 516' is closed for ¾ hour during which time zone 528 operates as an anaerobic zone releasing phosphorus. Then for ¼ hour with gate 516' closed, but possibly open, control unit 524 activates blower 452' and opens valve 454', thereby injecting air into treatment zone 528. Mixer 551 is active during the air injection process.

Typically, zone 530 operates on a dissolved oxygen set point, generally at a low value of dissolved oxygen. A dissolved-oxygen sensor (e.g., sensor 520a) provides control unit 524 with an encoded dissolved-oxygen magnitude. Control unit 524 then modulates the rotation rate of impeller 514 to maintain the predetermined set point in a feedback loop control. (The rotation rate of impeller 514 may also be subject to change for purposes of reducing total energy consumption, during those periods when blowers 452' and/or 452" are active.

Treatment zone 531 is typically operated to swing between an aerobic state (e.g., when diffusers or aerators 450" are injecting air into the zone) and an anoxic state. The relative proportion of time in the aerobic and anoxic states depends generally on a predetermined total nitrogen limit.

Control unit 524 is optionally configured to operate impeller 514 and diffused air injection elements 450' and 450" to reduce energy usage. Control unit 524 may be programmed to monitor energy usage, e.g., via inputs that encode the power used by impeller 514 and the power used by blowers 452' and 452", to compare total energy usage with similar total energy measurements made for other combinations of impeller power use and aerator power use under the same operating conditions, and to determine impeller and aerator power combinations that reduce the total amount of power used for one or more specific operating configurations. The reduced power combinations are then used in future occurrences of the operating conditions. Alternatively, control unit 524 may be preprogrammed to simply vary the rate of rotation of impeller 514 and the rate of air flow by the blowers 452' and 452" in accordance with the time of day, total throughput and other operating parameters.

As illustrated in FIG. 6, at least one input conduit 460 may extend to the first treatment zone 528 and the third treatment zone 531 for delivering influent thereto. The rate of influent to either one or both zones 528, 531 may be variable, for instance, via valve actuation (not shown) preferably by control unit 524. The dual influent fee 460 is contemplated to increase internal recycling and denitrification potential. An influent feed conduit branch 462 optionally extends to the second treatment zone 530, for use generally only during storms or flood conditions. Additionally, other input conduit 464 may extend to the first treatment zone 528 and/or the third treatment zone 531 for delivering recycled activated sludge (RAS) thereto. The rate of RAS to either one or both zones may be variable, for instance, via valve actuation preferably by the control unit.

Passage 534' forms an inlet passage to treatment zone 528 and passage 536' forms an outlet passage from treatment zone 528, the inlet passage 534' and the outlet passage 536' respectively having a first flow cross-sectional area and a second flow cross-sectional area each normal to a direction of liquor flow 546' and 548', respectively. Treatment zone 528 has a flow cross-sectional area normal to the direction of liquor flow through the treatment zone, that flow cross-sectional area being substantially larger than either of the flow cross-sectional areas of inlet passage 534' and outlet passage 536'. Passage 536" forms an inflow passage to treatment zone 531 and passage 534" forms an outflow passage from treatment zone 531, the inflow passage 536" and the outflow passage 534" having respective flow cross-sectional areas to a direction of liquor flow therethrough. Treatment zone 531 has flow cross-sectional area normal to the direction of liquor flow through the zone, that flow cross-sectional area being substantially larger than the flow cross-sectional area of either the inlet passage 536" or the outlet passage 534".

In the embodiment of FIG. 6, control unit 524 is typically programmed to move gate 516" to a fully closed position upon an earlier to occur of (i) a lapse of a predetermined time period (generally 3-10 minutes, for instance, about 5 minutes) after an opening of the gate from the fully closed position and (ii) a detection by sensor 520c that the nitrate or nitrogen level in zone 531 has fallen to a predetermined low threshold level (e.g., at or near zero). Control unit 524 may be additionally programmed to move gate 516" to an open position upon an earlier to occur of (i) a lapse of a predetermined time period (generally at least several hours) after a closing of the gate to a substantially fully closed position and (ii) a detection by sensor 520c that the nitrate or nitrogen level in zone 531 has risen to a predetermined upper threshold level.

The operation of gate 516' by control unit 524 may be similar to the operation of gate 116 by control unit 124, and in accordance with the above description of operation of the system of FIG. 6.

In general, control unit 524 may be programmed to maintain flow-diversion gate 516' or 516" in one extreme position for a predetermined time period and move the respective gate from the one extreme position after termination of that predetermined period. Thus, after a closing of gate 516', control unit 524 may maintain the gate in the closed position, blocking flow from aerobic/anoxic zone 530 to anoxic/anaerobic/aerobic zone 528, for predetermined period of time and to open the gate after termination of that period of time. The predetermined period may vary from 15 minutes to several hours, depending on the size of tank 512, the nitrogen and phosphorus content of the mixed liquor in anoxic/anaerobic/aerobic zone 528, the rate of liquor flow through the tank, etc.

Alternatively, as discussed below, control unit 524 may re-open gate 516' after detection of a predetermined set point of a control parameter (e.g., a chemical or biochemical concentration) via sensors 520a, 520b, 520c. Thus, gate 516' may be opened after a time that is shorter than the predetermined period referred to immediately above. Similarly, control unit 524 may close gate 516' after detection of a predetermined set point of a control parameter (e.g., a chemical or biochemical concentration) via sensors 520a, 520b, 520c. Thus, gate 516' may be closed after a time that is shorter than the predetermined period.

Control unit 524 may be additionally programmed to periodically and incrementally move each of the respective gates 516' and 516", for example, in a cycle from a partially open position to a fully closed position, depending on the outputs of sensors 520a, 520b, 520c, 520d (as installed).

Control unit 524 may move gate 516' to the fully closed position after lapse of a preset period commencing with the initial movement of the gate from the fully closed position. In a different operating scenario, control unit 524 may open gate 516' in stepwise fashion from the fully closed position and move the gate back to the fully opened position after lapse of a preset period commencing with the initial movement of the gate from the fully closed position.

Control unit 524 may thus be programmed to move gate 516' or 516" from a fully closed position (i.e., to start opening the gate) upon an earlier to occur of (i) a lapse of the predetermined additional time period after moving of gate 516' or 516" to the fully closed position and (ii) an automated detection by one or more sensors 520a, 520b, 520c, 520d of a predetermined magnitude of a nitrate concentration, phosphorus concentration, NADH concentration, ORP level, or mixed liquor velocity, ammonia concentration, dissolved oxygen concentration, or a combination of predetermined magnitudes of a plurality of chemical components.

More specifically, control unit 524 is configured to at least partially close flow-diversion gate 516', and at least inhibit the flow of mixed liquor stream 546' from aerobic/anoxic zone 530 to anoxic/anaerobic zone 528, in response to detection via sensor 520a of a drop in nitrate content in aerobic/anoxic zone 530 to a predetermined level. In that case, control unit 524 is programmed to substantially close flow-diversion gate 516', thereby substantially preventing the flow of mixed liquor stream 546' from aerobic/anoxic zone 530 to anoxic/anaerobic zone 528, in response to detection via the sensor of a drop in nitrate content in the aerobic/anoxic zone.

Control unit 524 may be further programmed to adjust the position of flow-diversion gate 516 and concomitantly the rate of flow of mixed liquor stream 546' through passage 534' to anoxic/anaerobic zone 528, in accordance with further sensor input, including NADH, ORP, ammonia, dissolved oxygen or phosphate content or mixed liquor velocity as measured by sensors 520a, 520b, 520c, 520d. For example, control unit 524 may be also programmed to at least partially open flow-diversion gate 516' and allow the flow of mixed liquor stream 546' from aerobic/anoxic zone 530 to anoxic/anaerobic/aerobic zone 528 in response to the detection by sensor 520b of a change in ORP, phosphorus, or NADH concentration to a predetermined level.

Figure 7:
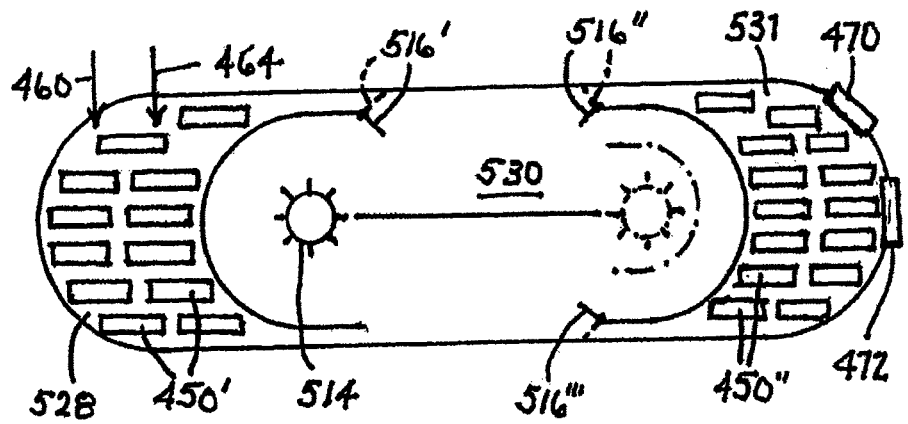
FIG. 7 is a diagram of a modification of the orbital wastewater treatment system of FIG. 6.

In the modified system of FIG. 7, in addition to gate 516" at passage 534" another flow-diversion gate or mechanism 516' is provided at passage 536" between zone 530 and zone 531. At least one weir 470 and/or 470 is provided at treatment zone 531, in communication therewith, for the extraction of effluent to be delivered to a clarifier (not shown). Gate 516' is regulated as described hereinabove with reference to gate 116 of FIG. 1. As described above, gate 516" is intermittently opened to flush nitrates back into the second treatment zone 530, so that nitrates are not part of the effluent exiting the system via weir 470 and/or 472. During most of the operating cycle, gate 516" is closed and treatment zone 531 is operated as a final treatment zone— with effluent discharged via weirs 470, 472. Influent feed conduit 460 extends only to the first treatment zone 528 and not to the third treatment zone 531. Likewise, RAS delivery conduit 464 extends only to the first treatment zone 528 and not to the third treatment zone 531.

The modified system of FIG. 7 may be operated in effect as two reactors in series, particularly when gate 516" is substantially closed, thereby blocking all but incidental flow or leakage from zone 531 to zone 530. The first reactor consists of treatment zones 528 and 530 with gate 516' being operated like gate 116 in FIG. 1. The second reactor consists of treatment zones 530 and 531, with effluent being discharged over weirs 470 and 472.

Treatment zone 531 in the embodiment of FIG. 7 is typically operated as a final treatment zone—with effluent discharged via weirs 470, 472. In the case of storm or flood conditions, flow-diversion gates 516" and 516''' between the second treatment zone 530 and the third treatment zone 531 are closed (thereby blocking all but incidental flow between the two zones) and air diffusers 450" and mixer 553 in the third treatment zone are deactivated, thereby facilitating a flow of effluent into weirs 470 and 472 and to the clarifier with minimum solid particle entrainment.

Figure 8:
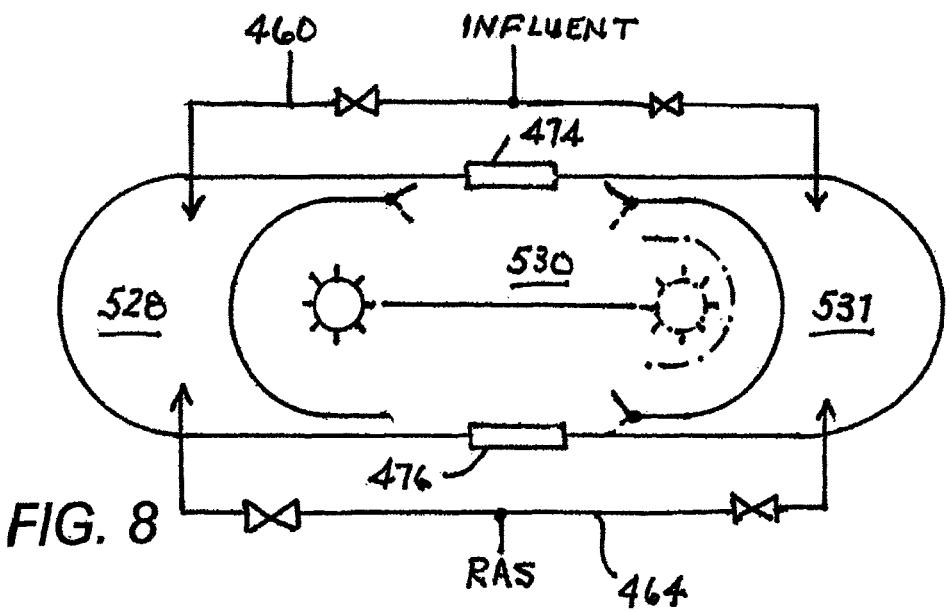
FIG. 8 is a diagram of another modification of the orbital wastewater treatment system of FIG. 6.

In the modified system of FIG. 8, where influent feed conduit 460 and RAS delivery conduit 464 extend to both treatment zone 528 and treatment zone 531, weirs 474 and 476 are provided at treatment zone 530 and communicate directly therewith. This double denitrification configuration serves to increase internal recycle and increase efficiencies of processing.

Figure 9:
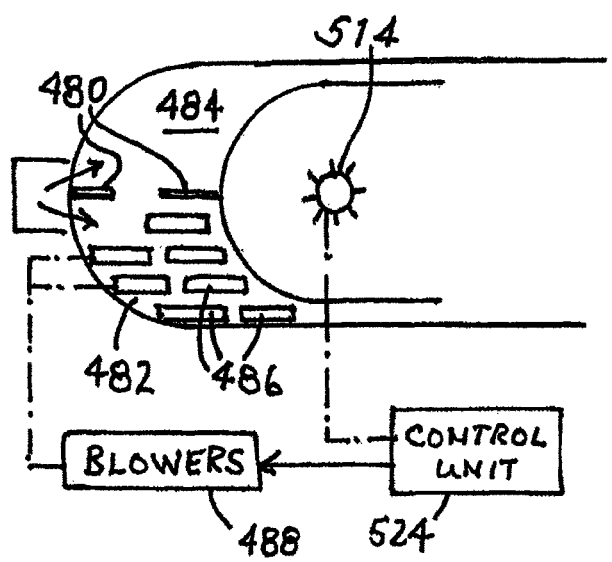
FIG. 9 is a diagram of a further modification of the orbital wastewater treatment system of FIG. 6.

In the modified system of FIG. 9, treatment zone 528 is provided with one or more partitions 480 that divide the treatment zone into two compartments 482 and 484 that can be operated as distinctive subzones. In particular, only one compartment 482 may be provided with air diffusers or aeration strips 486. After an anaerobic cycle ends, control unit 524 turns on blowers 488 to a maximum power draw. The resulting aeration enhances phosphorus uptake. Impeller 514 may be operated independently of diffusers or aerators 486.

Although the invention has been described in terms of particular embodiments and applications, one of ordinary skill in the art, in light of this teaching, can generate additional embodiments and modifications without departing from the spirit of or exceeding the scope of the claimed invention. For example, the two or more treatment zones in a tank assembly in accordance with the invention may be located in different tanks, while the passages through which mixed liquor flows between two treatment zones may be external conveyances such as pipes or conduits. Mixed liquor flow through the pipes or conduits may be implemented or augmented by pumping. In addition, the flow-diversion mechanism may take any form that enables adjustment of the rate of mixed-liquor flow through a passage between different treatment zones. The flow-diversion mechanism may be a pivoting gate as described herein, or a sliding gate, or a valve in a passage such as a pipe or conduit extending between two treatment zones. Accordingly, it is to be understood that the drawings and descriptions herein are proffered by way of example to facilitate comprehension of the invention and should not be construed to limit the scope thereof.

What is claimed is:

1. An orbital wastewater treatment system comprising:
    a tank assembly having at least a first treatment zone, a second treatment zone and a third treatment zone, said tank assembly having at least two first passages between said first treatment zone and said second treatment zone and at least two second passages between said second treatment zone and said third treatment zone; and
    at least one impeller in said tank assembly for moving mixed liquor under process about said tank assembly and through said passages;
    a first flow-diversion mechanism disposed at at least one of said first passages;
    a second flow-diversion mechanism disposed at at least one of said second passages;
    a first actuator operatively connected to said first flow-diversion mechanism;
    a second actuator operatively connected to said second flow-diversion mechanism; and
    a control unit operatively connected to said first actuator and said second actuator for regulating or adjusting a flow state or configuration of said first flow-diversion mechanism and said second flow-diversion mechanism.

2. The system defined in claim 1, further comprising a third flow-diversion mechanism disposed at another of said second passages, also comprising a third actuator operatively connected to said third flow-diversion mechanism, said control unit being operatively connected to said first actuator, said second actuator and said third actuator for regulating or adjusting a flow state or configuration of said first flow-diversion mechanism, said second flow-diversion mechanism and said third flow-diversion mechanism.

3. The system defined in claim 1, further comprising at least two air diffusers or aeration elements each disposed in one of said first treatment zone and said third treatment zone.

4. The system defined in claim 3, wherein said control unit is operatively connected to said impeller and said air diffusers or aeration elements and configured to operate said impeller and said air diffuser or aeration elements.

5. The system defined in claim 1, further comprising at least two mixers each disposed in a respective one of said first treatment zone and said third treatment zone.

6. The system defined in claim 5, also comprising at least one air diffuser or aeration element disposed in said one of said first treatment zone and said third treatment zone.

7. The system defined in claim 1 further comprising at least one weir disposed adjacent to and communicating with said third treatment zone.

8. The system defined in claim 1, further comprising at least one sensor in said tank assembly, said control unit being configured for regulating or adjusting a flow state or configuration of at least one of said first flow-diversion mechanism and said second flow-diversion mechanism at least partially in accordance with input from said sensor.

9. The system defined in claim 8 wherein said control unit is programmed to adjust said at least one of said first flow-diversion mechanism and said second flow-diversion mechanism to one of two states or configurations upon an earlier to occur of (i) a lapse of a predetermined time period after adjusting of said at least one of said first flow-diversion mechanism and said second flow-diversion mechanism from said one of said two states or configurations and (ii) a detection by said sensor of a predetermined magnitude of a preselected control parameter in one of said treatment zone, said second treatment zone and said third treatment zone.

10. The system defined in claim 9 wherein said control unit is further programmed to maintain said at least one of said first flow-diversion mechanism and said second flow-diversion mechanism in said one of said two states or configurations for a predetermined additional time period and to adjust said at least one of said first flow-diversion mechanism and said second flow-diversion mechanism from said one of said two states or configurations after termination of said additional time period.

11. The system defined in claim 10 wherein said control unit is further programmed to adjust said at least one of said first flow-diversion mechanism and said second flow-diversion mechanism from said one of said two states or configurations upon an earlier to occur of (i) a lapse of said predetermined additional time period after moving of said at least one of said first flow-diversion mechanism and said second flow-diversion mechanism to said one of said two states or configurations and (ii) an automated detection of a predetermined magnitude of a preselected control parameter in one of said first treatment zone, said second treatment zone and said third treatment zone.

12. The system defined in claim 9 wherein said first treatment zone is an anoxic zone convertible into an anaerobic zone, said second treatment zone is an aerobic zone convertible at least partially into an anoxic zone, and said third treatment zone is convertible between an aerobic zone and an at least partially anoxic zone, said one of said two states or configurations being a closed position inhibiting or preventing flow between said second treatment zone and at least one of said first treatment zone and said third treatment zone.

13. The system defined in claim 8 wherein said control unit is further programmed to periodically and incrementally adjust said at least one of and said second flow-diversion mechanism said first flow-diversion mechanism and said second flow-diversion mechanism.

14. The system defined in claim 8 wherein said first treatment zone is an anoxic zone convertible into an anaerobic zone, said second treatment zone is an aerobic zone convertible at least partially into an anoxic zone, said third treatment zone is convertible between an aerobic zone and an at least partially anoxic zone, said at least one of said first flow-diversion mechanism and said second flow-diversion mechanism being operable to regulate or adjust flow from said second treatment zone to said first treatment zone or from said third treatment zone to said second treatment zone.

15. The system defined in claim 8 wherein said sensor is taken from the group consisting of a phosphorus (P) sensor, an oxidation reduction potential (ORP) sensor, a dihydride nicotinamide adenine dinucleotide (NADH) sensor, an $NO_3$—N sensor, an ammonia ($NH_3$—N) sensor, a dissolved oxygen (DO) sensor, and a velocity sensor.

16. The system defined in claim 8 wherein said sensor is disposed in one of said first treatment zone and said second treatment zone, further comprising an additional sensor disposed in one of said first treatment zone, said second treatment zone and said third treatment zone, said additional sensor also being connected to said control unit for informing control operations thereof, said additional sensor being taken from the group consisting of a phosphorus (P) sensor, an oxidation reduction potential (ORP) sensor, a dihydride nicotinamide adenine dinucleotide (NADH) sensor, an $NO_3$—N sensor, an ammonia ($NH_3$—N) sensor, a dissolved oxygen (DO) sensor, and a velocity sensor.

17. The system defined in claim 8 wherein said first treatment zone is an anoxic zone convertible into an anaerobic zone, said second treatment zone is an aerobic zone convertible at least partially into an anoxic zone, said third treatment zone is convertible between an aerobic zone and an at least partially anoxic zone, further comprising a dissolved oxygen sensor disposed in said second treatment zone.

18. The system defined in claim 1 wherein said impeller is disposed in said second treatment zone, further comprising at least one mixer disposed in one of said first treatment zone and said third treatment zone.

19. The system defined in claim 18 wherein said control unit is operatively connected to said at least one mixer for altering operating states thereof at least partially in accordance with the flow state or configuration of said at least one of said first flow-diversion mechanism and said second flow-diversion mechanism or changes in a sensed process parameter.

20. The system defined in claim 1 wherein said first treatment zone and said third treatment zone are each operationally separated from said second treatment zone by said first flow-diversion mechanism and said second flow-diversion mechanism, respectively, and further by air diffusers or aeration elements in said first and said third treatment zone.

21. The system defined in claim 1, further comprising at least one input conduit extending to said first treatment zone and said third treatment zone for delivering influent to said first treatment zone and said third treatment zone.

22. The system defined in claim 1 wherein said control unit is programmed to operate at least one of said first flow-diversion mechanism and said second flow-diversion mechanism to assume predetermined flow states or configurations for predetermined time periods.

23. The system defined in claim 1 wherein said first treatment zone is an anoxic zone convertible into an anaerobic zone, said second treatment zone is an aerobic zone convertible at least partially into an anoxic zone, and said third treatment zone is convertible between an aerobic zone and an at least partially anoxic zone.

24. The system defined in claim 1, further comprising at least one first mechanical component in said first treatment zone and at least one second mechanical component in said third treatment zone, said at least one first mechanical component and said at least one second mechanical component being operative to change process parameters in said first treatment zone and said third treatment zone, respectively.

25. The system defined in claim 24 wherein said at least one first mechanical component and said at least one second mechanical component are taken from the group consisting of mixers and air diffusers or aeration elements.

26. A method for operating an orbital wastewater treatment system, said system including a tank assembly with at least a first treatment zone, a second treatment zone and a third treatment zone, said tank assembly having at least two passages between said first treatment zone and said second treatment zone and at least two second passages between said second treatment zone and said third treatment zone, said method comprising:
energizing at least one impeller in said tank assembly to move mixed liquor about said tank assembly; and
automatically adjusting a flow state or configuration of a flow-diversion mechanism at at least one of said passages to modify a flow of mixed liquor between said first treatment zone and said second treatment zone and between said second treatment zone and said third treatment zone,
said flow-diversion mechanism being a first flow-diversion mechanism disposed at at least one of said first passages, the system further comprising a second flow-diversion mechanism disposed at at least one of said second passages, further comprising automatically adjusting a flow state or configuration of said second flow-diversion mechanism to further modify the flow, of mixed liquor between said first treatment zone and said second treatment zone and between said second treatment zone and said third treatment zone.

27. The method defined in claim 26 wherein said first and said second flow-diversion mechanism are operated to cycle each of first treatment zone, said second treatment zone and said third treatment zone to aerobic conditions.

28. The method defined in claim 26, further comprising automatically adjusting the flow state or configuration of at least said second flow-diversion mechanism so that said third treatment zone operates as a recirculation zone.

29. The method defined in claim 26 wherein said system includes at least one effluent weir communicating with said third treatment zone, further comprising automatically adjusting the flow state or configuration of at least said second flow-diversion mechanism so that said third treatment zone operates as a final treatment stage with insignificant recirculation.

30. The method defined in claim 26 wherein the system further includes a third flow diversion mechanism disposed in or at another of said second passages, further comprising automatically adjusting a flow state or configuration of said third flow-diversion mechanism to further modify the flow of mixed liquor between said second treatment zone and at least said third treatment zone.

31. The method defined in claim 26, further comprising intermittently opening said second flow-diversion mechanism to flush nitrates back into said second treatment zone.

32. The method defined in claim 26 wherein the system includes a diffused-air injection element disposed in at least one of said first treatment zone and said third treatment zone, further comprising operating said impeller and said diffused air injection element at respective selected power levels to reduce energy usage.

33. The method defined in claim 26 wherein the system includes at least one diffused air injection element disposed in one of said first treatment zone and said third treatment zone, further comprising injecting air into one of said first treatment zone and said third treatment zone upon a termination of an aerobic cycle, thereby enhancing phosphorus uptake in the respective treatment zone.

34. The method defined in claim 26, further comprising channeling influent to said first treatment zone and said third treatment zone.

35. The method defined in claim 24, further comprising automatically operating a first mixer in said first treatment zone and a second mixer in said third treatment zone, said impeller being located in said second treatment zone.

36. The method defined in claim 24, further comprising injecting air into at least one of said first treatment zone and said third treatment zone via one or more air diffusers or aeration strips.

37. The method defined in claim 26 wherein the automatic adjusting of the flow state or configuration of said flow-diversion mechanism is so performed that in one of said first treatment zone and said third treatment zone, denitrification occurs during a first predetermined period and phosphorus release occurs during a subsequent second predetermined period, further comprising operating air diffusers in said one of said first treatment zone and said third treatment zone during a third predetermined period for inducing phosphorus uptake.

38. The method defined in claim 37, further comprising operating said second treatment zone on a dissolved-oxygen set point.

39. The method defined in claim 37, further comprising controlling flow through said third treatment zone so that said third treatment zone swings between an anoxic operating condition and an aerobic operating condition.

40. The method defined in claim 26, further comprising automatically operating a sensor at a given location in said tank assembly, the automatic adjusting of the flow state or configuration of at least one of said first flow-diversion mechanism and said second flow-diversion mechanism being implemented at least partially in accordance with an output of said sensor.

41. The method defined in claim 40 wherein the adjusting of the flow state or configuration of said at least one of said first flow-diversion mechanism and said second flow-diversion mechanism includes adjusting said at least one of said first flow-diversion mechanism and said second flow-diversion mechanism to one of two states or configurations upon an earlier to occur of (i) a lapse of a predetermined time period after adjusting of said at least one of said first flow-diversion mechanism and said second flow-diversion mechanism from said one of said two states or configurations and (ii) a detection by said sensor of a predetermined magnitude of a control parameter in one of said first treatment zone, said second treatment zone and said third treatment zone.

42. The method defined in claim 41 wherein the adjusting of the flow state or configuration of said at least one of said first flow-diversion mechanism and said second flow-diversion mechanism includes maintaining said at least one of said first flow-diversion mechanism and said second flow-diversion mechanism in said one of said two states or configurations for a predetermined additional time period and adjusting said at least one of said first flow-diversion mechanism and said second flow-diversion mechanism from said one of said two states or configurations after termination of said additional time period.

43. The method defined in claim 42 wherein the adjusting of the flow state or configuration of said at least one of said first flow-diversion mechanism and said second flow-diversion mechanism further includes periodically and incrementally adjusting said at least one of said first flow-diversion mechanism and said second flow-diversion mechanism.

44. The method defined in claim 41 wherein the adjusting of the flow state or configuration of said at least one of said first flow-diversion mechanism and said second flow-diversion mechanism further includes adjusting said at least one of said first flow-diversion mechanism and said second flow-diversion mechanism from said one of said two states or configurations upon an earlier to occur of (i) a lapse of a predetermined additional time period after adjusting of said at least one of said first flow-diversion mechanism and said second flow-diversion mechanism to said one of said two states or configurations and (ii) an automated detection of a predetermined magnitude of a preselected control parameter in one of said first treatment zone, said second treatment zone and said third treatment zone.

45. The method defined in claim 41 wherein said first treatment zone is an anoxic zone convertible into an anaerobic zone, said second treatment zone is an aerobic zone convertible at least partially into an anoxic zone, said third treatment zone is convertible between an aerobic zone and an at least partially anoxic zone, said one of said two states or configurations being a closed position inhibiting or preventing flow between said first treatment zone and said second treatment zone or between said third treatment zone and said second treatment zone.

46. The method defined in claim 40 wherein said sensor is taken from the group consisting of a phosphorus (P) sensor, an oxidation reduction potential (ORP) sensor, a dihydride nicotinamide adenine dinucleotide (NADH) sensor, an $NO_3$—N sensor, an ammonia ($NH_3$—N) sensor, a dissolved oxygen (DO) sensor, and a velocity sensor.

47. The method defined in claim 40, further comprising operating an additional sensor disposed in one of said first treatment zone, said second treatment zone and said third treatment zone, the automatic adjusting of the flow state or configuration of said at least one of said first flow-diversion mechanism and said second flow-diversion mechanism being implemented at least partially in accordance with an output of said additional sensor, said additional sensor being taken from the group consisting of a phosphorus (P) sensor, an oxidation reduction potential (ORP) sensor, a dihydride nicotinamide adenine dinucleotide (NADH) sensor, an $NO_3$—N sensor, an ammonia ($NH_3$—N) sensor, a dissolved oxygen (DO) sensor, and a velocity sensor.

48. The method defined in claim 26, further comprising:
delivering recycled activated sludge and influent to at least one of said first treatment zone and said third treatment zone; and
automatically regulating flow of recycled activated sludge and influent to said at least one of said first treatment zone and said third treatment zone at least partially in accordance with a detected magnitude of a control parameter at said given location in said tank assembly.

49. The method defined in claim 26 wherein the adjusting of said at least one of said first flow-diversion mechanism and said second flow-diversion mechanism includes keeping said at least one of said first flow-diversion mechanism and said second flow-diversion mechanism closed for predetermined time periods.

50. The method defined in claim 26 wherein said impeller is located in said second treatment zone, at least one first mixer being provided in said first treatment zone and at least one second mixer being provided in said third treatment zone, further comprising altering operating states of said at least one first mixer and said at least one second mixer at least partially in accordance with the flow state or configuration of said at least one of said first flow-diversion mechanism and said second flow-diversion mechanism or changes in a sensed process parameter.

51. The method defined in claim 26, further comprising operating at least one first mechanical component in said first treatment zone and at least one second mechanical component in said third treatment zone to change process parameters in said first treatment zone and said third treatment zone, respectively.

52. The method defined in claim 51 wherein said at least one first mechanical component and said at least one second mechanical component are taken from the group consisting of mixers and air diffusers or aeration elements.

53. An orbital wastewater treatment system comprising:
a tank assembly having at least a first treatment zone, a second treatment zone and a third treatment zone, said tank assembly having at least two first passages between said first treatment zone and said second treatment zone and at least two second passages between said second treatment zone and said third treatment zone; and
at least one impeller in said tank assembly for moving mixed liquor under process about said tank assembly and through said first passages and said second passages,
wherein one of said at least two first passages forms an inlet passage to said first treatment zone and the other of said at least two first passages forms an outlet passage from said first treatment zone, said inlet passage and said outlet passage respectively having a first flow cross-sectional area and a second flow cross-sectional area each normal to a direction of liquor flow, said first treatment zone having a third flow cross-sectional area normal to the direction of liquor flow, said third flow cross-sectional area being substantially larger than said first flow cross-sectional area, said third flow cross-sectional area being substantially larger than said second flow cross-sectional area, said one of said at least two second passages forms an inflow passage to said third treatment zone and the other of said at least two second passages forms an outflow passage from said third treatment zone, said inflow passage and said outflow passage respectively having a fourth flow cross-sectional area and a fifth flow cross-sectional area each normal to a direction of liquor flow, said third treatment zone having a sixth flow cross-sectional area normal to the direction of liquor flow, said sixth flow cross-sectional area being substantially larger than said fourth flow cross-sectional area, said third flow cross-sectional area being substantially larger than said fifth flow cross-sectional area.

* * * * *